United States Patent
Bandou

[19]

[11] Patent Number: 6,133,803
[45] Date of Patent: Oct. 17, 2000

[54] HORIZONTAL OSCILLATOR WITH GRADUAL FREQUENCY SWITCHING CIRCUIT

[75] Inventor: Takahiro Bandou, Tokyo, Japan

[73] Assignee: Mitsubishi Denki Kabushiki Kaisha, Tokyo, Japan

[21] Appl. No.: 09/275,192

[22] Filed: Mar. 23, 1999

[30] Foreign Application Priority Data

Oct. 9, 1998 [JP] Japan .................................. 10-287779

[51] Int. Cl.[7] .............................. H03L 7/00; H04N 5/05
[52] U.S. Cl. ........................ 331/179; 315/399; 348/540
[58] Field of Search ................................. 331/20, 177 R, 331/179; 315/399, 408, 409, 410; 348/540, 541

[56] References Cited

U.S. PATENT DOCUMENTS 4,705,993  11/1987  Kashiwagi ............................... 315/408

FOREIGN PATENT DOCUMENTS 59-107683   6/1984   Japan .
60-181965  12/1985   Japan .
62-181578   8/1987   Japan .

Primary Examiner—Siegfried H. Grimm

[57] ABSTRACT

A horizontal deflection circuit (61) includes a horizontal oscillator circuit (51) having a horizontal oscillation IC (1). A terminal (T12) of the horizontal oscillation IC (1) is connected to respective first ends of capacitors (8a, 8b). The capacitor (8a) has a second end grounded. The capacitor (8b) has a second end connected to a collector terminal of a transistor (9). The transistor (9) has an emitter terminal grounded through a resistor (11), and a base terminal grounded through a capacitor (13) and connected to a terminal (T121) of a microprocessor (12) through a resistor (14). The horizontal oscillation IC (1) receives a voltage (VT71) at a terminal (T13) thereof and a feedback voltage (VT31) at a terminal (T15) thereof. The circuit (51) generates a signal (VT14) synchronized with a horizontal synchronizing signal (HD) applied to a terminal (T11) to output the signal (VT14). The horizontal deflection circuit prevents stresses from being applied to a horizontal output circuit when the frequency of the input signal is changed.

4 Claims, 6 Drawing Sheets

HORIZONTAL OSCILLATOR WITH GRADUAL FREQUENCY SWITCHING CIRCUIT

BACKGROUND OF THE INVENTION

1. Field of the Invention

The present invention relates to a horizontal oscillator circuit for use in a CRT automatic scanning monitor. More particularly, the invention relates to a technique for making a stable change in the frequency of an output signal from a horizontal oscillator circuit when a change occurs in the frequency of an input horizontal synchronizing signal inputted to the horizontal oscillator circuit.

2. Description of the Background Art

At the present time, CRT display monitors are utilized in various applications. In particular, automatic scanning monitors which are capable of handling input video signals based on various standards by using only a single display monitor and of automatically discriminating between such various input video signal standards to display images conforming to the respective standards, have found widespread applications.

To handle input video signals having frequencies ranging from 15.75 kHz which is a television frequency to 100 kHz which is required for use as a workstation display monitor, such an automatic scanning monitor comprises a horizontal oscillator circuit capable of generating such a wide range of horizontal frequencies. The construction and basic operation of the horizontal oscillator circuit is described with reference to FIG. 7. FIG. 7 is a circuit diagram schematically showing the general construction of a horizontal deflection circuit 161 for a CRT display monitor.

As illustrated in FIG. 7, the horizontal deflection circuit 161 comprises a horizontal oscillator circuit 151 which includes a horizontal oscillation IC 101, two capacitors 108a and 108b, a transistor 109, and a diode 110.

The horizontal oscillation IC 101 has a terminal T1011 connected to an interconnect line through which an input horizontal synchronizing signal HD is transmitted. The interconnect line is branched at a midpoint for connection to a terminal T1122 of a microprocessor 112.

The horizontal oscillation IC 101 further includes a terminal T1012 connected commonly to respective first ends of the capacitors 108a and 108b. The capacitor 108a has a second end grounded. The capacitor 108b has a second end connected commonly to a cathode terminal of the diode 110 and a collector terminal of the transistor 109. An anode terminal of the diode 110 and an emitter terminal of the transistor 109 are grounded. The transistor 109 has a base terminal connected to a terminal T1121 of the microprocessor 112. The two capacitors 108a and 108b which control the frequency of an output signal VT1014 from the horizontal oscillator circuit 151 as will be described later are also referred to generically as an "oscillating capacitor 108."

A circuit 141 including the transistor 109 and the diode 110 functions as a switch for (electrically) connecting the capacitor 108b to the terminal 1012 or to the first end of the capacitor 108a or for disconnecting the capacitor 108b from the first end as will be described later during the operation of the horizontal oscillation IC 101. Thus, the circuit 141 is referred to hereinafter as a "switching circuit 141."

The horizontal oscillation IC 101 further includes a terminal T1013 connected commonly to a first end (positive terminal) of a capacitor 115 and a first end of a resistor 116. The capacitor 115 has a second end (negative terminal) grounded. The resistor 116 has a second end connected to a terminal T1071 of a D/A converter 107. The capacitor 115 and the resistor 116 function as a filter. A terminal T1073 of the D/A converter 107 and a terminal T1123 of the microprocessor 112 are connected to each other through a predetermined interconnect line.

The horizontal oscillation IC 101 further includes a terminal T1014 connected to an input terminal of a horizontal drive circuit 102. The horizontal drive circuit 102 has an output terminal connected to a first input terminal of a horizontal output circuit 103. The horizontal output circuit 103 has an output terminal connected to a terminal T1015 of the horizontal oscillation IC 101.

The horizontal output circuit 103 has a second input terminal connected through a choke coil 104 to an output terminal of a variable power supply circuit 105. The variable power supply circuit 105 has a first input terminal connected to an output terminal of a power supply circuit 106, and a second input terminal connected commonly to a first end (positive terminal) of a capacitor 117 and a first end of a resistor 118. The capacitor 117 has a second end (negative terminal) grounded, and the resistor 118 has a second end connected to a terminal T1072 of the D/A converter 107. The capacitor 117 and the resistor 118 function as a filter.

A terminal T1124 of the microprocessor 112 is connected to an input terminal of the power supply circuit 106.

The basic operation of the horizontal deflection circuit 161 of FIG. 7 is discussed below.

First described is the operation when the switching circuit 141 is OFF, that is, when the transistor 109 is OFF and the terminal T1012 of the horizontal oscillation IC 101 is connected only to the capacitor 108a.

The horizontal oscillator circuit 151 generates a voltage pulse (also referred to simply as a "pulse") VT1014 having the same frequency and the same phase as the input horizontal synchronizing signal HD applied to the terminal T1011 to output the voltage pulse VT1014 at the terminal T1014. The horizontal drive circuit 102 amplifies the pulse VT1014 to output a signal VT102. The horizontal output circuit 103 is driven by the signal VT102. At this time, an output signal VT1031 from the deflection circuit 161 is inputted (fed back) to the terminal T1015 of the horizontal oscillation IC 101. Thus, the horizontal deflection circuit 161 includes a loop circuit having a signal-flow path extending from the terminal T1014 through the horizontal drive circuit 102 and the horizontal output circuit 103 to the terminal T1015. The horizontal oscillation IC 101 compares the phase of the feedback signal VT1031 with the phase of the input horizontal synchronizing signal HD serving as a reference signal to generate the pulse VT1014 in phase with the input horizontal synchronizing signal HD. Thus, the loop circuit including the horizontal oscillation IC 101 functions as a PLL circuit for generating the signal VT1014 synchronized with the input horizontal synchronizing signal HD.

In particular, the free-running frequency of an oscillation portion included in the horizontal oscillation IC 101 is controlled by the charging and discharging of the capacitor 108a connected to the terminal T1012 (or the two capacitors 108a and 108b if they are connected to the terminal T1012). Since such charging and discharging are performed so that a voltage VT1012 at the terminal T1012 falls within a range from a voltage level Vmin to a voltage level Vmax as shown in FIG. 8, the voltage VT1012 has a sawtooth voltage waveform. A constant current source included in the horizontal oscillation IC 101 performs the above-mentioned charging and discharging, and provides a current value controlled by the voltage level at the terminal T1013.

Thus, the rate of change in the sawtooth voltage shown in FIG. 8 (the slope of the graph of FIG. 8) in accordance with the above charging and discharging operation is determined by the capacitance of the oscillating capacitor 108 connected to the terminal T1012 and the output current from the constant current source (the voltage applied to the terminal T1013 accordingly). In other words, the free-running frequency of the oscillation portion in the horizontal oscillation IC 101 is controllable by the capacitance of the oscillating capacitor 108 and the voltage level VT1071 at the terminal T1013. As shown in FIG. 7, a predetermined signal from the microprocessor 112 is applied as the output voltage VT1071 from the D/A converter 107 to the terminal T1013. Finally, the loop circuit (PLL circuit) including the horizontal oscillation IC 101 generates and outputs the output pulse VT1014 having the same frequency and the same phase as the input horizontal synchronizing signal HD.

A predetermined power supply voltage V105 is applied from the variable power supply circuit 105 through the choke coil 104 to the horizontal output circuit 103. A power supply voltage V106 from the power supply circuit 106 is applied to the variable power supply circuit 105. At this time, a predetermined signal from the microprocessor 112 is inputted as an output voltage VT1072 from the D/A converter 107 to the variable power supply circuit 105. The variable power supply circuit 105 generates the voltage V105 based on the voltage VT1072 to output the voltage V105 to the horizontal output circuit 103.

The above description may be applied to the operation in a steady state wherein the capacitor 108b is connected to the terminal T1012 of the horizontal oscillation IC 101 and the oscillating capacitor 108 is comprised of the two capacitors 108a and 108b.

In the horizontal deflection circuit 161, the microprocessor 112 changes an output voltage VT1121 at the terminal T1121 to control the ON/OFF states of the transistor 109, changing the capacitance of the oscillating capacitor 108. Specifically, the microprocessor 112 turns OFF the transistor 109 to connect only the capacitor 108a to the terminal T1012 of the horizontal oscillation IC 101 (state (i)), whereas the microprocessor 112 turns ON the transistor 109 to connect the two capacitors 108a and 108b to the terminal T1012 (state (ii)). Changing between the two states (i) and (ii) is referred to hereinafter as "switching the oscillating capacitor 108."

In each of the states (i) and (ii), the horizontal oscillation IC 101 can generate a pulse having a frequency within a range of about (maximum frequency)/(minimum frequency) ≦3 by controlling the voltage level applied at the terminal T1013. For example, in the state (i), the horizontal deflection circuit 161 designed to handle the input horizontal synchronizing signal HD having a frequency range from 45 kHz to 100 kHz can accommodate a change in the frequency of the input horizontal synchronizing signal HD between 48 kHz and 64 kHz, with the state (i) remaining intact. In the state (ii), the horizontal deflection circuit 161 designed to handle the input horizontal synchronizing signal HD having a frequency range from 15.75 kHz to 45 kHz can accommodate a change in the frequency of the input horizontal synchronizing signal HD between 15.75 kHz and 31.5 kHz, with the state (ii) remaining intact.

On the other hand, when the frequency of the input horizontal synchronizing signal HD changes, for example, from 64 kHz to 15.75 kHz, the horizontal deflection circuit 161 must accommodate the change by changing the transistor 109 from the OFF state to the ON state. In other words, when such a frequency change is made, the horizontal deflection circuit 161 switches the oscillating capacitor 108 from the state (i) in which only the capacitor 108a is connected to the terminal T1012 to the state (ii) in which the two capacitors 108a and 108b are connected to the terminal T1012.

Conversely, when the frequency of the input horizontal synchronizing signal HD changes, for example, from 15.75 kHz to 64 kHz, the horizontal deflection circuit 161 changes the transistor 109 from the ON state to the OFF state to switch the oscillating capacitor 108 from the state (ii) to the state (i).

Description is given on the operation of the horizontal deflection circuit 161 or the horizontal oscillator circuit 151 when the oscillating capacitor 108 is switched from the state (i) in which only the capacitor 108a is used as the oscillating capacitor 108 to the state (ii) in which the two capacitors 108a and 108b are used, with reference to FIG. 7.

The microprocessor 112 always receives the input horizontal synchronizing signal HD to measure the frequency of the input horizontal synchronizing signal HD. Upon detecting a change in the frequency of the input horizontal synchronizing signal HD, the microprocessor 112 transmits to the power supply circuit 106 a signal VT1124 for causing the power supply circuit 106 to suspend the supply of power to the variable power supply circuit 105.

At the time that the power supply voltage V105 supplied from the variable power supply circuit 105 to the horizontal output circuit 103 reaches approximately 0 V after the power supply circuit 106 suspends the supply of power to the variable power supply circuit 105 based on the signal VT1124, the microprocessor 112 outputs (applies) the voltage VT1121 for turning ON the transistor 109. At this time, the microprocessor 112 outputs the voltage VT1071 and the voltage VT1072 corresponding to the new frequency of the input horizontal synchronizing signal HD through the D/A converter 107 to the horizontal oscillation IC 101 and the variable power supply circuit 105, respectively.

After a lapse of predetermined time (previously set) required until the frequency of the output pulse VT1014 from the terminal T1014 of the horizontal oscillation IC 101 is stabilized, the microprocessor 112 transmits to the power supply circuit 106 the signal VT1124 for causing the power supply circuit 106 to restart the supply of power to the variable power supply circuit 105.

Through the above described operation, the horizontal oscillator circuit 151 generates the output pulse VT1014 in accordance with the new input horizontal synchronizing signal HD, and then the horizontal deflection circuit 161 outputs the signal synchronized with the new input horizontal synchronizing signal HD based on the pulse VT1014.

In the horizontal deflection circuit 161, as above described, the variable power supply circuit 105 is temporarily powered OFF for the connection of the capacitor 108b to the terminal T1012. The necessity for the power-off operation is described below.

The frequency of the output pulse VT1014 from the horizontal oscillation IC 101 changes abruptly at the instant that the capacitor 108b is connected to the terminal T1012. The output voltage V105 from the variable power supply circuit 105 which is newly set in accordance with the change in the frequency of the input horizontal synchronizing signal HD is incapable of following the abrupt frequency change of the voltage VT1014 because of the presence of a circuit component such as the choke coil 104. An attempt to abruptly change the output voltage V105 from the variable power supply circuit 105 so as to follow the frequency change results in an overshoot in the output voltage V105. Thus, electrical stresses are applied to the horizontal output circuit 103 if the frequency of the pulse VT1014 abruptly changes while the variable power supply circuit 105 continues supplying power to the horizontal output circuit 103. Under such circumstances, a mismatch (incompatibility) occurs, in the horizontal output circuit 103, between the frequency of the input pulse VT1014 from the horizontal oscillation IC 101 (or the input pulse VT102 from the horizontal drive circuit 102) and the voltage level supplied from the variable power supply circuit 105. This results in the electrical stresses applied to components constituting the horizontal output circuit 103. Such stresses might cause trouble in the horizontal output circuit 103 and the like. To avoid the electrical stresses and yet the trouble, the horizontal deflection circuit 161 is adapted to temporarily power OFF the variable power supply circuit 105 as above described.

Similar events can occur when the capacitor 108b connected to the terminal T1012 (in the state (ii)) is disconnected therefrom (into the state (i)). Therefore, the horizontal deflection circuit 161 is also adapted to temporarily power OFF the variable power supply circuit 105 when the oscillating capacitor 108 is switched from the state (ii) to the state (i).

If there is no need to switch the oscillating capacitor 108, e.g. for frequency changes between 15.75 kHz and 31.5 kHz and between 48 kHz and 64 kHz, the capacitor 115 and the resistor 116 connected between the horizontal oscillation IC 101 and the D/A converter 107 or the capacitor 117 and the resistor 118 connected between the D/A converter 107 and the variable power supply circuit 105 can adjust the rate of change in the frequency of the output pulse VT1014 from the horizontal oscillation IC 101 or the rate of change in the output voltage V105 from the variable power supply circuit 105. In such cases, the above-mentioned electrical stresses in the horizontal output circuit 103 are suppressed, and hence there is no need to power OFF the variable power supply circuit 105.

Using the horizontal deflection circuit 161 which can accomplish the above operation, the automatic scanning monitor receives the video signals based on various standards which differ in the input horizontal synchronizing signal HD to correctly display images.

As described hereinabove, the background art horizontal deflection circuit 161 or the background art horizontal oscillator circuit 151 is adapted such that when there is a need to connect the capacitor 108b to the terminal T1012 of the horizontal oscillation IC 101 or disconnect the capacitor 108b therefrom, power supply from the power supply circuit 106 to the variable power supply circuit 105 is temporarily cut off and then restarted after a lapse of fixed time. Thus, the background art horizontal deflection circuit 161 has a drawback in that, when a change in the frequency of the input horizontal synchronizing signal HD occurs which involves the switching of the oscillating capacitor 108, the fixed time is required to provide a stable image after the frequency change (or the response to the frequency change of the input horizontal synchronizing signal HD is slow).

SUMMARY OF THE INVENTION

According to a first aspect of the present invention, a horizontal oscillator circuit comprises: an oscillation circuit for generating an output signal synchronized with an input horizontal synchronizing signal to output the output signal, the oscillation circuit including an oscillation portion; a first capacitor having a first end connected to the oscillation portion and a second end grounded for controlling a frequency of the output signal from the oscillation circuit; a second capacitor having a first end connected to the first end of the first capacitor and a second end for controlling the frequency of the output signal in conjunction with the first capacitor; and a constant current source circuit having a control terminal and connected to the second end of the second capacitor for outputting an output current having a current value controllable by a control voltage applied to the control terminal thereof.

Preferably, according to a second aspect of the present invention, in the horizontal oscillator circuit of the first aspect, the constant current source circuit comprises: a bipolar transistor having a collector terminal connected to the second end of the second capacitor, an emitter terminal, and a base terminal serving as the control terminal; and a resistor having a first end connected to the emitter terminal of the bipolar transistor, and a second end grounded.

Preferably, according to a third aspect of the present invention, in the horizontal oscillator circuit of the second aspect, the control voltage having a gradually changing voltage level is applied to the base terminal of the bipolar transistor when the constant current source circuit is activated and inactivated.

Preferably, according to a fourth aspect of the present invention, the horizontal oscillator circuit of the second or third aspect further comprises a time constant circuit having an output terminal connected to the base terminal of the bipolar transistor.

(1) In accordance with the first aspect of the present invention, the horizontal oscillator circuit comprises the constant current source circuit. When the output current from the constant current source circuit has a zero current value (inactive), only the first capacitor is (electrically) connected to the oscillation portion of the oscillation circuit (conversely, the second capacitor is (electrically) disconnected from the oscillation portion). When the output current has a current value other than zero, i.e., when the constant current source circuit outputs the output current (active), both of the first and second capacitors are connected to the oscillation portion. At this time, the output current from the constant current source circuit corresponds to a current flowing through the second capacitor. In particular, according to the first aspect of the present invention, the current value of the output current from the constant current source circuit is controllable by the control voltage applied to the control terminal thereof. Thus, a gradual change in the output current enables the current flowing through the second capacitor to gradually change. This consequently allows the gradual charging and discharging of the second capacitor which controls the frequency of the output signal generated in the oscillation portion, thereby preventing an abrupt change in the frequency of the output signal (synchronized with the input horizontal synchronizing signal) from the oscillation circuit when the second capacitor is connected to and disconnected from the oscillation portion.

Additionally, when the horizontal oscillator circuit of the first aspect of the present invention is applied in place of the background art horizontal oscillator circuit to a horizontal deflection circuit, the horizontal deflection circuit can significantly suppress electrical stresses which have occurred in a horizontal output circuit of the background art horizontal deflection circuit during both of the connection and the disconnection of the second capacitor. This significantly reduces the occurrence of trouble resulting from the stresses in the horizontal output circuit and the like. Further, the horizontal deflection circuit which is free from the stresses in the horizontal output circuit eliminates the suspension of the supply of power to the horizontal output circuit which has been required in the background art horizontal deflection circuit for the connection and disconnection of the second capacitor. Therefore, the horizontal deflection circuit according to the first aspect provides stable image display more rapidly than the background art horizontal deflection circuit when a change occurs in the frequency of the input horizontal synchronizing signal which requires the connection and the disconnection of the second capacitor.

(2) In accordance with the second aspect of the present invention, the constant current source circuit comprises the bipolar transistor having the base terminal corresponding to the control terminal, and the resistor. For gradual change in the voltage applied to the base terminal, the collector or emitter current of the bipolar transistor which is the output current from the constant current source circuit may be gradually changed. This allows the gradual change in the current flowing through the second capacitor, providing an effect similar to the effect (1).

Additionally, in accordance with the second aspect of the present invention, the emitter terminal of the bipolar transistor is grounded through the resistor. This allows the suppression of variations in the output characteristics of the collector current or the emitter current of the bipolar transistor, e.g., variations in the output characteristics resulting from a temperature change during operation and device characteristic variations of the bipolar transistor. Therefore, the horizontal oscillator circuit achieves a stable operation.

(3) In accordance with the third aspect of the present invention, the control voltage having the gradually changing voltage level is applied to the base terminal serving as the control terminal. Thus, the collector current or the emitter current of the bipolar transistor may be gradually changed when the constant current source circuit is activated and inactivated. As a result, the horizontal oscillator circuit of the third aspect provides an effect similar to the effect (2).

(4) In accordance with the fourth aspect of the present invention, the horizontal oscillator circuit comprises the time constant circuit connected to the base terminal of the bipolar transistor, thereby applying the gradually changing voltage to the base terminal serving as the control terminal of the constant current source circuit. Therefore, the horizontal oscillator circuit of the fourth aspect provides an effect similar to the effect (2).

It is therefore a primary object of the present invention to provide a horizontal oscillator circuit which eliminates the need to power OFF a (variable) power supply circuit when an oscillating capacitor is switched in accordance with a change in the frequency of an input horizontal synchronizing signal.

It is another object of the present invention to provide a horizontal oscillator circuit which accomplishes the primary object under stable conditions.

These and other objects, features, aspects and advantages of the present invention will become more apparent from the following detailed description of the present invention when taken in conjunction with the accompanying drawings.

DESCRIPTION OF THE PREFERRED EMBODIMENTS (First Preferred Embodiment)

Figure 1:
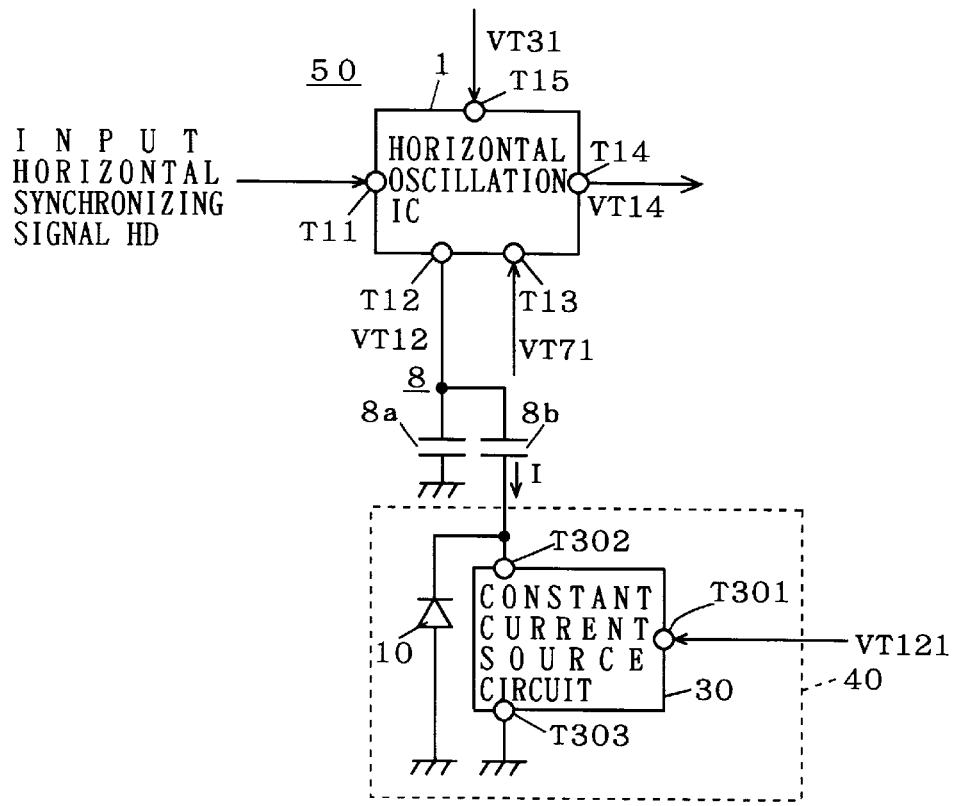
FIG. 1 is a schematic circuit diagram of a horizontal oscillator circuit according to a first preferred embodiment of the present invention.

FIG. 1 is a schematic circuit diagram showing the general construction of a horizontal oscillator circuit 50 according to a first preferred embodiment of the present invention.

As illustrated in FIG. 1, the horizontal oscillator circuit 50 comprises a horizontal oscillation IC (oscillation circuit) 1, two capacitors 8a and 8b, a constant current source circuit 30, and a diode 10.

More specifically, the horizontal oscillation IC 1 includes five terminals T11 to T15. The terminal T12 of the horizontal oscillation IC 1 is connected commonly to respective first ends of the capacitor 8a (first capacitor) and the capacitor 8b (second capacitor). The capacitor 8a has a second end grounded. The capacitor 8b has a second end connected to an input terminal T302 of the constant current source circuit 30 which is a feature of the horizontal oscillator circuit 50. The constant current source circuit 30 has an output terminal T303 grounded, and a control terminal T301 which receives a predetermined control signal VT121 (control voltage). The second end of the capacitor 8b is also connected to a cathode terminal of the diode 10 having an anode terminal grounded.

In particular, the constant current source circuit 30 is a current source which provides an output current directed from its input terminal T302 toward its output terminal T303 (directed from the capacitor 8b to the ground), the value of the output current being controllable by the signal VT121 applied to the control terminal T301.

With the horizontal oscillator circuit 50 in operation, when the output current from the constant current source circuit 30 is flowing (or when the constant current source circuit 30 is active), the capacitor 8b is (electrically) connected to the terminal T12 or to the first end of the capacitor 8a. Then, the diode 10 functions as a path for a current flow in the direction reverse to the output current from the constant current source circuit 30 during the charging and discharging of the capacitor 8b to be described later.

Conversely, when the output current from the constant current source circuit 30 is not flowing (or when the constant current source circuit 30 is inactive), the capacitor 8b is (electrically) disconnected from the terminal T12 or from the first end of the capacitor 8a. Then, the potential at the cathode terminal of the diode 10 is higher than that at the anode terminal thereof, and hence no current flows through the path including the diode 10.

In this manner, the diode 10 in conjunction with the constant current source circuit 30 functions as a switch for switching between two states: a state in which the capacitor 8b is connected to the terminal T12 and a state in which the capacitor 8b is disconnected from the terminal T12. Thus, a circuit including the elements surrounded by the broken lines of FIG. 1, i.e. the constant current source circuit 30 and the diode 10, is also referred to as a "switching circuit 40."

In view of the above-mentioned function of the switching circuit 40, when the second end of the capacitor 8b is connected to the output terminal T303 of the constant current source circuit 30 and the input terminal T302 of the constant current source circuit 30 is grounded, the anode terminal of the diode 10 is connected to the second end of the capacitor 8b and the cathode terminal thereof is grounded.

Figure 2:
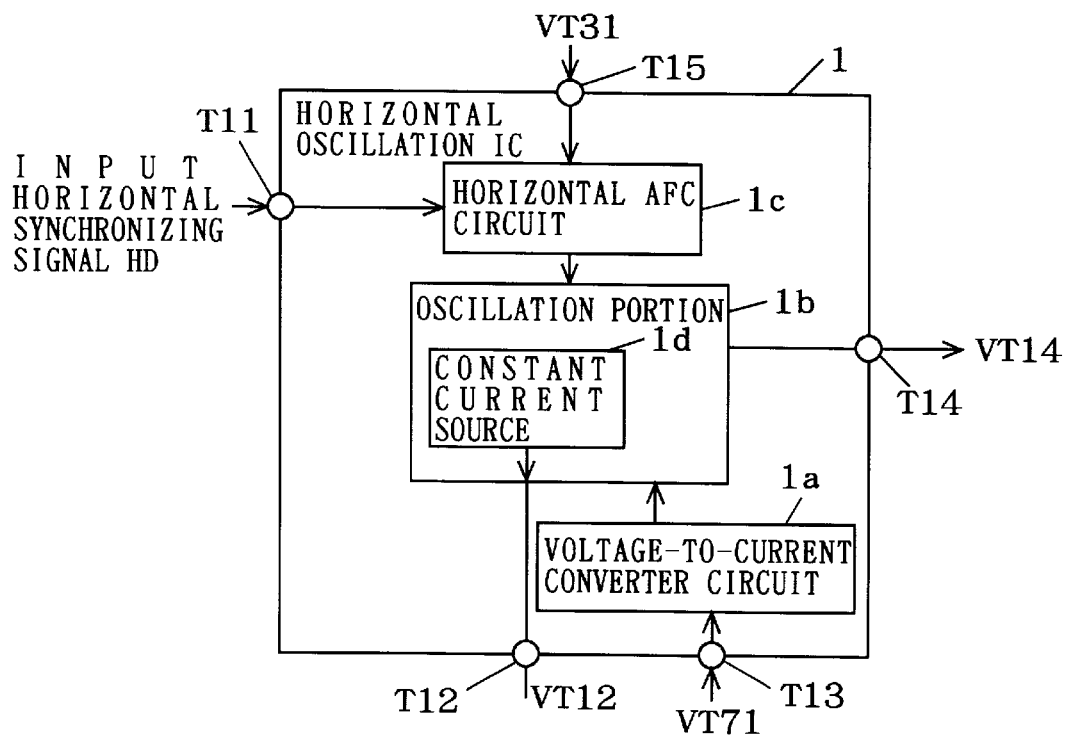
FIG. 2 is a schematic circuit diagram of a horizontal oscillation IC.

The horizontal oscillator circuit 50 or the horizontal oscillation IC 1 generates a voltage pulse (also referred to simply as a "pulse" hereinafter) VT14 (an output signal synchronized with the horizontal synchronizing signal HD) having the same frequency and the same phase as the horizontal synchronizing signal HD, based on the horizontal synchronizing signal HD applied to the terminal T11 thereof, to output the pulse VT14 at the terminal T14 of the horizontal oscillation IC 1. Such an operation will be discussed below with reference to FIG. 2. FIG. 2 is a schematic circuit diagram showing the internal construction of the horizontal oscillation IC 1.

As illustrated in FIG. 2, the horizontal oscillation IC 1 comprises an oscillation portion 1b and a horizontal AFC circuit 1c. The horizontal AFC circuit 1c compares the phase of a signal or voltage VT31 (corresponding to a feedback signal in a deflection circuit 61 to be described later and shown in FIG. 3) applied to the terminal T15 of the horizontal oscillation IC 1 with the phase of the input horizontal synchronizing signal HD serving as a reference signal to output a control signal to the oscillation portion 1b so that the phase difference therebetween is minimized. Then, the horizontal oscillator circuit 50 generates and outputs the signal VT14 having the same frequency and the same phase as the input horizontal synchronizing signal HD, based on the control signal. When the horizontal oscillator circuit 50 is applied to a horizontal deflection circuit, the signal VT14 is inputted as the feedback signal VT31 to the horizontal oscillation IC 1 through a horizontal drive circuit and a horizontal output circuit (See the horizontal drive circuit 102 and the horizontal output circuit 103 shown in FIG. 7). The horizontal AFC circuit 1c and the oscillation portion 1b in the horizontal oscillation IC 1 constitute a loop circuit corresponding to a PLL circuit having a signal-flow path extending from the terminal T14 through the horizontal drive circuit and the horizontal output circuit to the terminal T15. The loop circuit (PLL circuit) generates the pulse VT14 having the same frequency as the input horizontal synchronizing signal HD and in phase with the input horizontal synchronizing signal HD. Description will be given on the generation of an oscillation signal having a predetermined frequency in the oscillation portion 1b when only the capacitor 8a is connected to the terminal T12.

Figure 8:
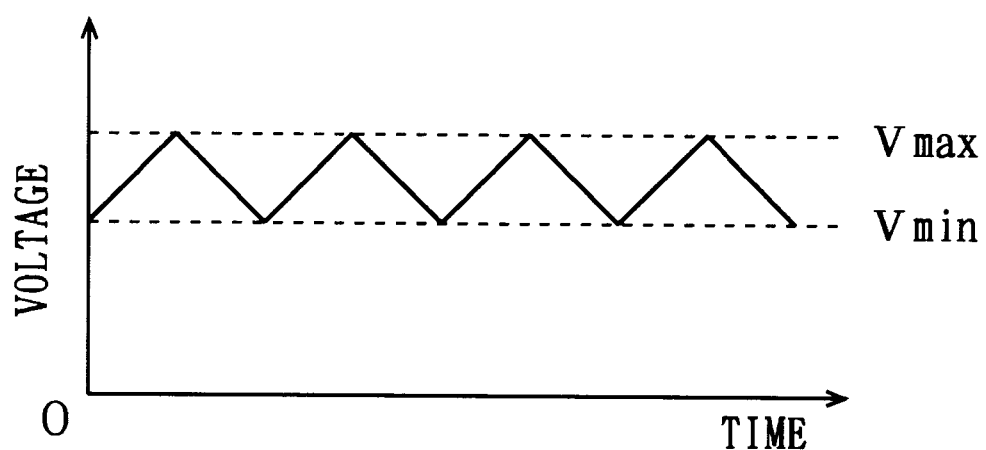
FIG. 8 is a graph showing changes in voltage at a terminal of a horizontal oscillation IC with time.

The oscillation signal from the oscillation portion 1b is generated by the charging and discharging of the capacitor 8a. The charging and discharging of the capacitor 8a is performed so that the output current from a constant current source 1d provided in the oscillation portion 1b provides a voltage VT12 at the terminal T12 having a voltage level which falls within a range from a voltage level Vmin to a voltage level Vmax. Thus, the voltage VT12 has a sawtooth waveform (See FIG. 8).

The output current from the constant current source 1d has a value in accordance with the value of a current generated (converted) in a voltage-to-current converter circuit 1a included in the horizontal oscillation IC 1, based on a voltage VT71 applied to the terminal T13. Hence, the free-running frequency of the oscillation portion 1b is determined by the voltage VT71, and the PLL circuit finally generates the signal VT14 (synchronized with the input horizontal synchronizing signal) having the same frequency and the same phase as the input horizontal synchronizing signal HD.

Additional connection of the capacitor 8b to the terminal T12 may decrease the rate of the charging and discharging to generate a signal having a lower frequency. This also allows the free-running frequency control (and a wide frequency change is achieved by combining the change in the capacitance of the capacitor connected to the terminal T12 and the control of the voltage VT71). In view of the functions of the capacitors 8a and 8b, the capacitors 8a and 8b are also referred to generically as an "oscillating capacitor 8." Connecting the capacitor 8b to the terminal T12 or the first end of the capacitor 8a and disconnecting the capacitor 8b from the terminal T12 or the first end of the capacitor 8a are referred to hereinafter as "switching the oscillating capacitor 8."

Description will now be given on a transient operation when a transition is made from the connection of only the capacitor 8a to the terminal T12 to the connection of the two capacitors 8a and 8b to the terminal T12 (or when the oscillating capacitor 8 is switched).

In particular, the horizontal oscillator circuit 50 accomplishes the switching of the capacitor 8 by turning ON the switching circuit 40, i.e., by causing a current to flow through the constant current source circuit 30. At this time, the output current from the constant current source circuit 30 which is determined by the signal VT121 having a predetermined voltage level applied to the control terminal T301 of the constant current source circuit 30 is gradually increased by gradually increasing the voltage VT121. After the output current reaches a predetermined current value, the output current is held at the value. Then, the output current from the constant current source circuit 30 corresponds to a current I (current value I) flowing through the capacitor 8b. Thus, the horizontal oscillator circuit 50 enables the current to gradually flow to the capacitor 8b when the capacitor 8b is connected to the terminal T12. This eliminates the problem with the background art horizontal oscillator circuit 151 shown in FIG. 7 that the current abruptly flows into the capacitor 108b at the instant that the transistor 109 turns ON.

Therefore, the horizontal oscillator circuit 50 can gradually change the frequency of the voltage VT12 (sawtooth voltage) at the terminal T12 of the horizontal oscillation IC 1 when the capacitor 8b is connected to the terminal T12, thereby to gradually change the frequency of the output pulse VT14 from the horizontal oscillator circuit 50.

The above-mentioned predetermined current value from the constant current source circuit 30, i.e., the value of the output current from the constant current source circuit 30 when the horizontal oscillator circuit 50 in which the two capacitors 8a and 8b are connected to the terminal T12 is in a steady state is set at the current value I flowing through the capacitor 8b in this steady state. The output current value from the constant current source 1d in the horizontal oscillation IC 1 in the steady state is divided into two values in proportion to the respective capacitances of the two capacitors 8a and 8b. The predetermined current value from the constant current source circuit 30 is one of the two values which is in proportion to the capacitance of the capacitor 8b. Accordingly, the output current value from the constant current source circuit 30 is a predetermined value depending on the voltage VT71 applied to the terminal T13.

The switching circuit may be turned OFF to make a transition from the connection of the two capacitors 8a and 8b to the terminal T12 to the connection of only the capacitor 8a to the terminal T12. At this time, the constant current source circuit 30 outputs the output current which gradually decreases from the predetermined current value to finally reach zero as the signal (voltage) VT121 applied to the control terminal T301 gradually decreases after the time at which the voltage VT121 is changed. Therefore, the horizontal oscillator circuit 50 can also gradually change the frequency of the output pulse VT14 during such a transition.

A more specific construction of the horizontal oscillator circuit 50 of FIG. 1 will be described in accordance with a second preferred embodiment of the present invention.

(Second Preferred Embodiment)

Figure 3:
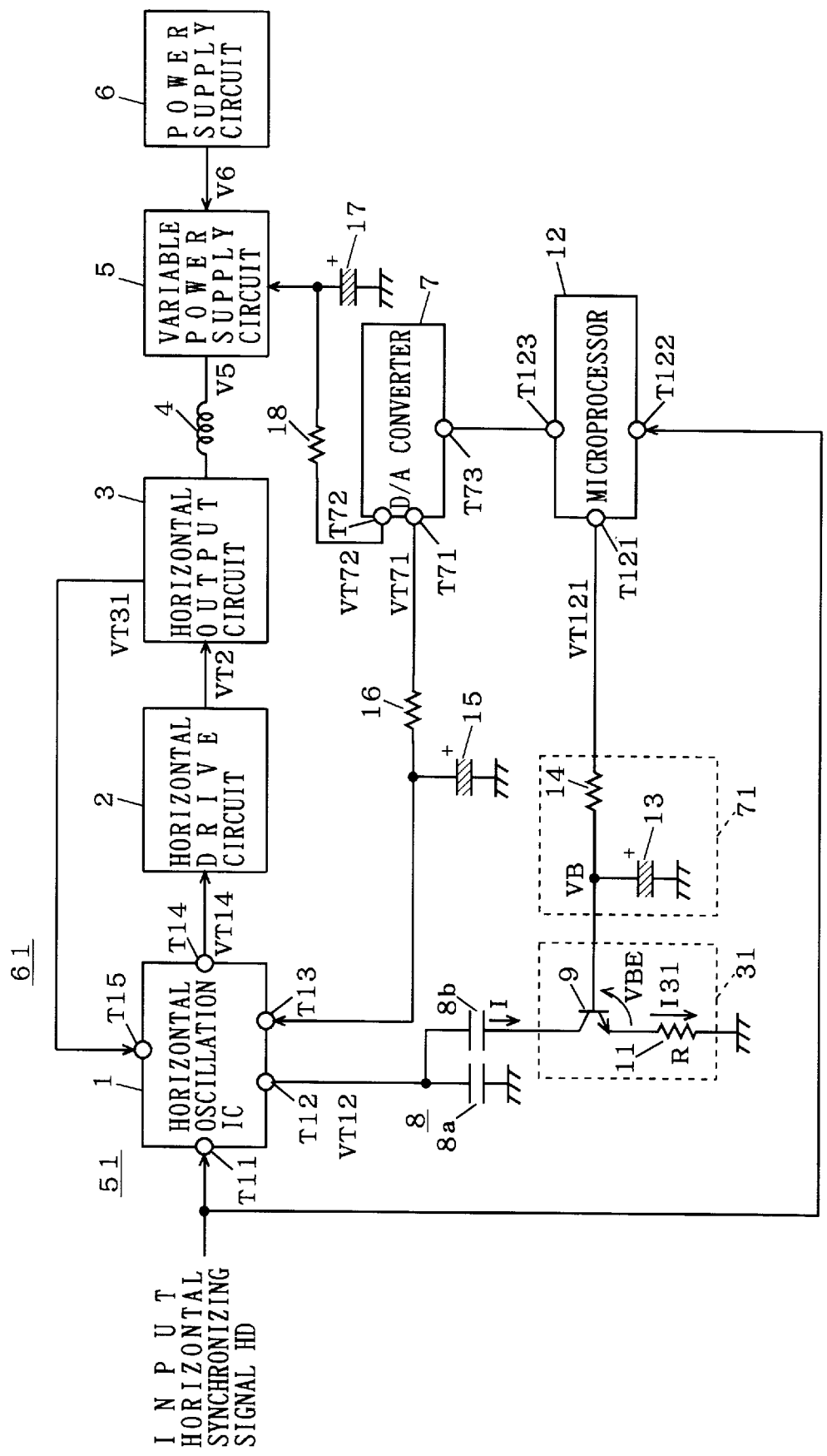
FIG. 3 is a schematic circuit diagram of the horizontal oscillator circuit according to a second preferred embodiment of the present invention.

FIG. 3 is a schematic circuit diagram showing the general construction of the horizontal deflection circuit 61 for a CRT automatic scanning monitor which comprises a horizontal oscillator circuit 51 according to the second preferred embodiment of the present invention. Like reference characters are used in FIG. 3 to designate elements identical with those of FIG. 1.

As illustrated in FIG. 3, the horizontal oscillator circuit 51 corresponding to the horizontal oscillator circuit 50 of FIG. 1 comprises the above-mentioned horizontal oscillation IC 1. The terminal T11 of the horizontal oscillation IC 1 is connected to a predetermined interconnect line through which the input horizontal synchronizing signal HD is transmitted. The interconnect line is branched at a midpoint for connection to a terminal T122 of a microprocessor 12.

In the horizontal oscillator circuit 51, in particular, the second end of the capacitor 8b is connected to a collector terminal of a bipolar transistor (also referred to simply as a "transistor") 9. The transistor 9 has an emitter terminal grounded through a resistor 11 having a resistance R, and a base terminal connected commonly to a first end of a capacitor 13 (corresponding to a positive terminal since the capacitor 13 used herein is polarized) and to a first end of a resistor 14. The capacitor 13 has a second end (negative terminal) grounded. The resistor 14 has a second end connected to a terminal T121 of the microprocessor 12. The capacitor 13 and the resistor 14 function as a filter (time constant circuit) 71. The capacitor 13 used herein may be unpolarized.

A circuit 31 comprising the transistor 9 and the resistor 11 corresponds to the constant current source circuit 30 of FIG. 1. In particular, the function of the diode 10 of the switching circuit 40 as the path for the current flow in the direction reverse to the output current from the constant current source circuit is implemented by a path passing through a diode formed by the base-collector junction of the transistor, i.e., a path extending from the capacitor 13 through the base of the transistor 9 and the collector of the transistor 9 to the capacitor 8b. Thus, the horizontal oscillator circuit 51 requires no diode in the switching circuit 40. Hence, the circuit 31 is referred to hereinafter as a "constant current source circuit 31" or a "switching circuit 31." Consequently, the horizontal oscillator circuit 51 of FIG. 3 comprises the horizontal oscillation IC 1, the capacitors 8a and 8b (the oscillating capacitor 8) connected commonly to the terminal T12 of the horizontal oscillation IC 1, the switching circuit 31 connected to the capacitor 8b, and the time constant circuit 71.

The terminal T13 of the horizontal oscillation IC 1 is connected commonly to a first end (positive terminal) of a capacitor 15 (a polarized capacitor herein) and to a first end of a resistor 16. The capacitor 15 has a second end (negative terminal) grounded. The resistor 16 has a second end connected to a terminal T71 of a D/A converter 7. The capacitor 15 and the resistor 16 function as a filter. A terminal T73 of the D/A converter 7 and a terminal T123 of the microprocessor 12 are connected to each other through a predetermined interconnect line. The capacitor 15 used herein may be unpolarized.

The terminal T14 of the horizontal oscillation IC 1 is connected to an input terminal of a horizontal drive circuit 2. The horizontal drive circuit 2 has an output terminal connected to a first input terminal of a horizontal output circuit 3. The horizontal output circuit 3 has an output terminal connected to the terminal T15 of the horizontal oscillation IC 1.

The horizontal output circuit 3 has a second input terminal connected to an output terminal of a variable power supply circuit 5 through a choke coil 4. The variable power supply circuit 5 has a first input terminal connected to an output terminal of a power supply circuit 6, and a second input terminal connected commonly to a first end (positive terminal) of a capacitor 17 (a polarized capacitor herein) and to a first end of a resistor 18. The capacitor 17 has a second end (negative terminal) grounded. The resistor 18 has a second end connected to a terminal T72 of the D/A converter 7. The capacitor 17 and the resistor 18 function as a filter. The capacitor 17 used herein may be 15 unpolarized.

Figure 7:
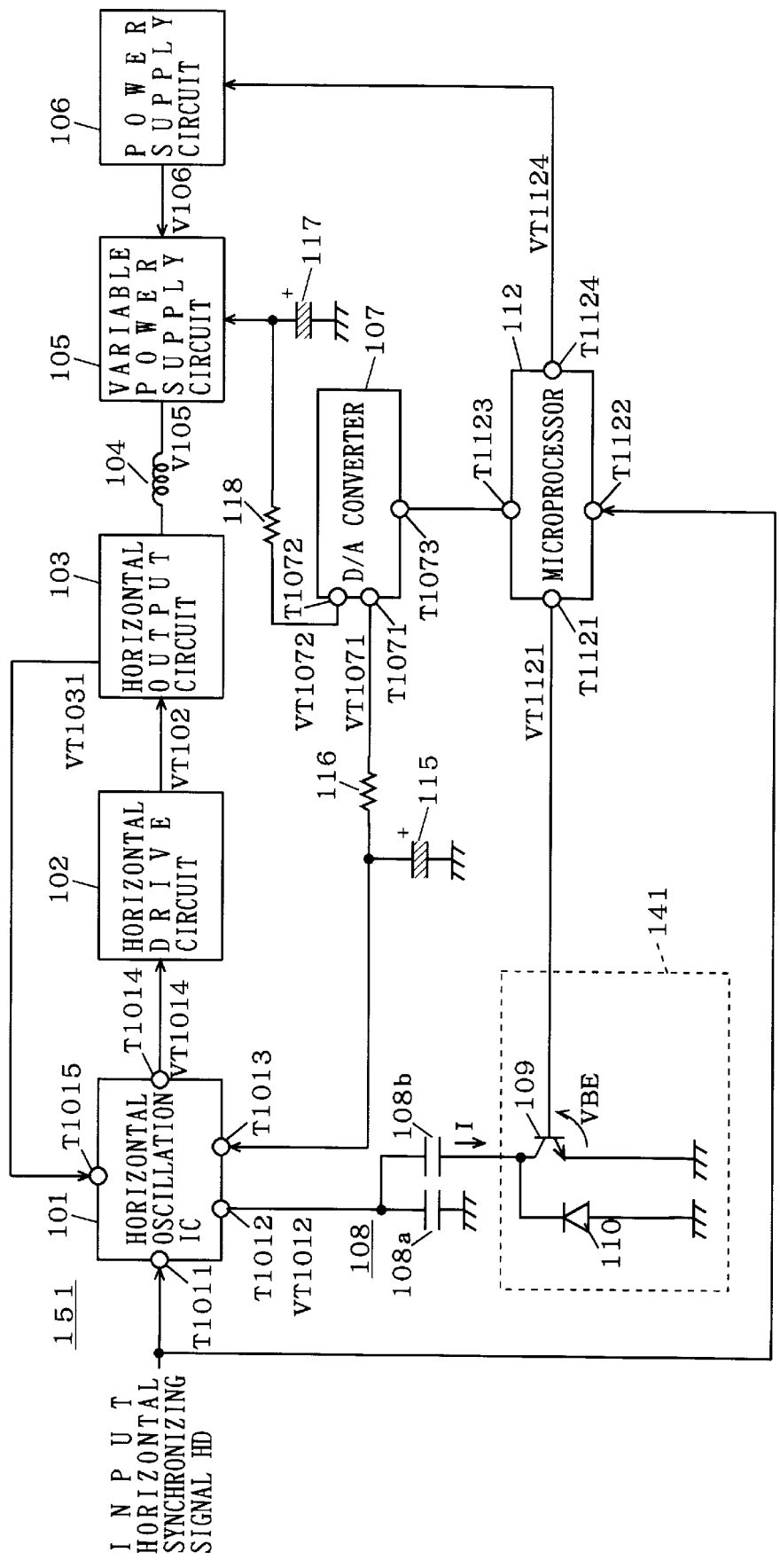
FIG. 7 is a circuit diagram of a background art horizontal oscillator circuit.

The horizontal oscillator circuit 51 constructed as described above differs from the background art horizontal oscillator circuit 151 of FIG. 7 in that it comprises the resistor 11, the capacitor 13, and the resistor 14 but does not comprise the diode 110. Further, the horizontal deflection circuit 61 does not comprises the interconnect line (path) provided in the background art horizontal deflection circuit 161 of FIG. 7 for connection between the terminal T1124 of the microprocessor 112 and the power supply circuit 106.

The operation of the horizontal deflection circuit 61 will be discussed hereinafter.

First described is the operation of the horizontal deflection circuit 61 when the switching circuit 31 is OFF, i.e., when only the capacitor 8a is connected to the terminal T12 of the horizontal oscillation IC 1. The OFF state of the switching circuit 31 is provided by controlling the signal (voltage at the terminal T121) VT121 outputted from the terminal T121 of the microprocessor 12 so as to turn OFF the transistor 9.

The horizontal oscillation IC 1 performs the above described operation to generate the voltage pulse VT14 having the same frequency and the same phase as the input horizontal synchronizing signal HD. At this time, a predetermined signal from the microprocessor 12 is inputted as the output voltage VT71 from the D/A converter 7 to the terminal T13 of the horizontal oscillation IC 1. The horizontal oscillation IC 1 outputs the pulse VT14 at the terminal T14 to the horizontal drive circuit 2.

The horizontal drive circuit 2 amplifies the pulse VT14 to output a signal VT2. The horizontal output circuit 3 is driven by the signal VT2 to input (feed back) the voltage VT31 to the horizontal oscillation IC 1 at the terminal T15.

A predetermined power supply voltage V5 is applied from the variable power supply circuit 5 through the choke coil 4 to the horizontal output circuit 3. A power supply voltage V6 from the power supply circuit 6 is applied to the variable power supply circuit 5, and a predetermined signal from the microprocessor 12 is also applied as an output voltage VT72 from the D/A converter 7 to the variable power supply circuit 5.

The variable power supply circuit 5 generates the voltage V5 based on the voltage VT72 to output the voltage VS to the horizontal output circuit 3.

The above description is also applied to the operation in the steady state when the switching circuit 31 is ON, i.e., when the capacitor 8b is connected to the terminal T12 of the horizontal oscillation IC 1.

The horizontal oscillator circuit 51 is designed to generate a signal having a frequency within a predetermined frequency range, for example, about (maximum frequency)/(minimum frequency)≦3, i.e., to accommodate a change in the frequency of the input horizontal synchronizing signal HD within such a range, in each of two states: a state (i) in which only the capacitor 8a is connected to the terminal T12 and a state (ii) in which the two capacitors 8a and 8b are connected to the terminal T12.

Next described is the operation of the horizontal oscillator circuit 51 or the horizontal deflection circuit 61 when, with only the capacitor 8a connected to the terminal T12, a change in the frequency of the input horizontal synchronizing signal HD occurs which requires the connection of the capacitor 8b to the capacitor 8a for accommodation.

In the horizontal deflection circuit 61, the microprocessor 12 always measures the frequency of the input horizontal synchronizing signal HD inputted thereto at the terminal T122. When the microprocessor 12 judges that a change has occurred in the frequency of the input horizontal synchronizing signal HD, the microprocessor 12 then judges whether or not the frequency change requires the capacitor 8b to be connected to the capacitor 8a (or the terminal T12). Upon judgement that the capacitor 8b is required to be connected to the capacitor 8a, the microprocessor 12 outputs the voltage VT121 (voltage level VT121) at the terminal T121. When the voltage VT121 is applied to the transistor 9 to turn ON the transistor 9, i.e., to turn ON the switching circuit 31, the capacitor 8b is connected to the terminal T12 or the first end of the capacitor 8a.

In the horizontal oscillator circuit 51, the time constant circuit 71 including the resistor 14 and the capacitor 13 is connected between the terminal T121 and the base terminal of the transistor 9 as shown in FIG. 3. Thus, the base voltage VB of the transistor 9 gradually increases with a time constant (also referred to hereinafter as a "CR time constant") specified by the capacitance of the capacitor 13 and the resistance of the resistor 14 to finally reach the voltage VT121.

A current I31 flowing through the resistor 11, i.e. the output current I31 (current value I31) from the constant current source circuit 31, is given by dividing the base voltage VB (voltage level VB) of the transistor 9 minus a forward voltage drop VBE (voltage level VBE) between the base and the collector of the transistor 9 by the resistance R of the resistor 11. The current value I31 is expressed as $$I31=(VB-VBE)/R \tag{1}$$

It will also be understood from Equation (1) that the current value I31 gradually increases based on the CR time constant as the base voltage VB of the transistor 9 changes, to reach the current value in proportion to the capacitance of the capacitor 8b which is obtained by dividing the current flowing through the terminal T12 of the horizontal oscillation IC 1 using the proportion of the respective capacitances of the capacitors 8a and 8b. Thus, the current value I31 calculated by Equation (1) must be set greater than the above-described current to be finally reached.

In the subsequent steady state, the horizontal oscillator circuit 51 performs an operation similar to the above-described operation in the steady state in which only the capacitor 8a is connected to the terminal T12, to generate the output voltage VT14.

As discussed above, the horizontal oscillator circuit 51 which comprises the constant current source circuit 31 and the time constant circuit 71 can gradually increase the current I flowing through the capacitor 8b with the increase in the output current I31 from the constant current source circuit 31 when the voltage VT121 is outputted from the microprocessor 12. In other words, the horizontal oscillator circuit 51 is capable of making a slower transition from the state in which only the capacitor 8a is connected to the terminal T12 to the state in which the two capacitors 8a and 8b are connected to the terminal T12 than the background art horizontal oscillator circuit 151 of FIG. 7. Therefore, the horizontal oscillator circuit 51 can gradually change the frequency of the pulse VT14 outputted at the terminal T14.

The microprocessor 12 turns OFF the switching circuit 31 upon judgement that the capacitor 8b is required to be disconnected so that only the capacitor 8a is connected to the terminal T12 when the frequency of the input horizontal synchronizing signal HD is changed, with the two capacitors 8a and 8b connected to the terminal T12. Specifically, the microprocessor 12 changes the voltage VT121 (to 0 V) so that the transistor 9 turns OFF. Also during the change, since the time constant circuit 71 decreases the base voltage VB of the transistor 9 with the CR time constant, the current I31 gradually decreases based on the CR time constant. This prevents the abrupt disconnection of the capacitor 8b. During such a state transition, the horizontal oscillator circuit 51 therefore provides effects similar to those provided when the capacitor 8b is connected to the terminal T12 or the capacitor 8a.

Unlike the background art horizontal oscillator circuit 151 of FIG. 7, the horizontal oscillator circuit 51 thus prevents electrical stresses from being applied to the components of the horizontal output circuit 3 when the oscillating capacitor 8 is switched. Conversely, the CR time constant, i.e., the capacitance of the capacitor 13 and the resistance of the resistor 14 is set so that such electrical stresses are not caused. This provides the effect of causing no trouble in the horizontal output circuit 3 resulting from the switching of the oscillating capacitor 8. Additionally, the horizontal oscillator circuit 51 involves no need to turn OFF the power supply circuit 6 during the switching of the oscillating capacitor 8, thereby to provide stable image display rapidly.

In the above description, the time constant circuit 71 is provided in the horizontal oscillator circuit 51 in order to gradually change the base voltage (control voltage) at the base terminal (control terminal) of the transistor 9. It is needless to say that the above-mentioned effects may be provided if the terminal T121 of the microprocessor 12 is directly connected to the base terminal, with the time constant circuit 71 removed, and the control signal VT121 outputted from the microprocessor 12 is gradually changed to gradually change the base voltage VB.

The operation stability of the horizontal oscillator circuit 51 during the switching of the oscillating capacitor 8 will be discussed below. The consideration of the stability is given by a comparison between the operation of the horizontal oscillator circuit 51 and the operation of a horizontal oscillator circuit 512 including a constant current source circuit 312 of another construction.

Figure 4:
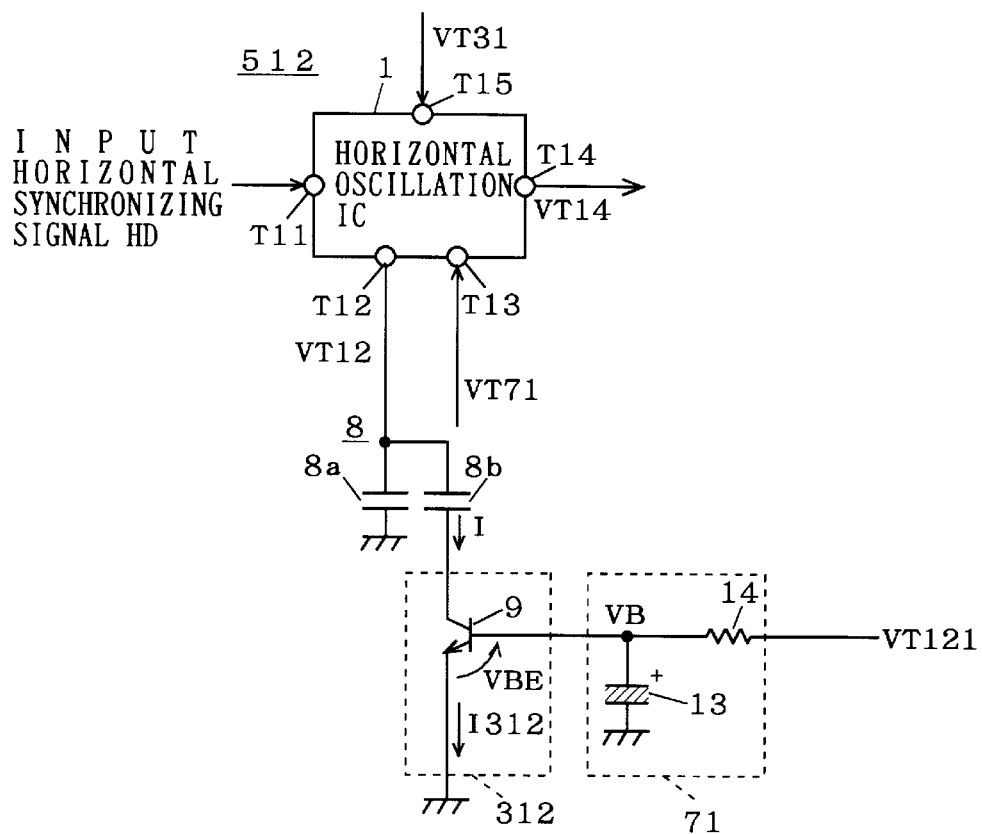
FIG. 4 is a schematic circuit diagram of a horizontal oscillator circuit for evaluating the operation stability of the horizontal oscillator circuit of the second preferred embodiment by comparison.

FIG. 4 is a schematic circuit diagram of the horizontal oscillator circuit 512. Like reference characters are used to designate elements of the horizontal oscillator circuit 512 which are identical with those of the horizontal oscillator circuit 51 of FIG. 3.

As illustrated in FIG. 4, the horizontal oscillator circuit 512 is constructed such that the resistor 11 of the horizontal oscillator circuit 51 of FIG. 3 is removed and the emitter terminal of the transistor 9 is directly grounded. Then, the transistor 9 itself constitutes the "constant current source circuit 312" or the "switching circuit 312" corresponding to the constant current source circuit 31.

Figure 5:
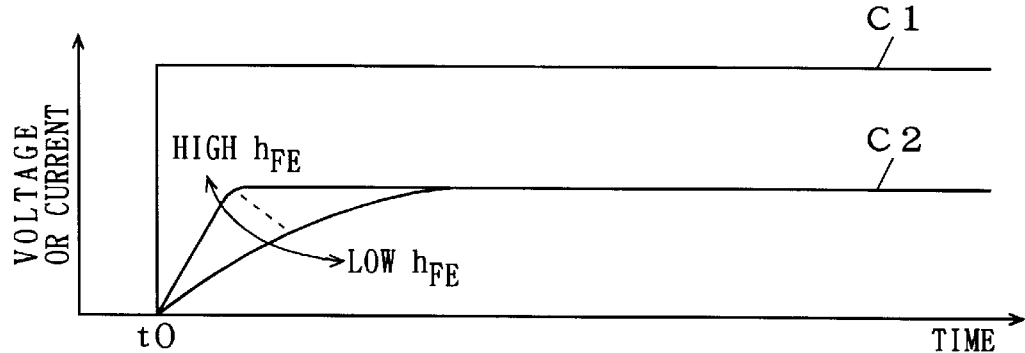
FIG. 5 is a graph showing a relationship between a control signal (voltage) applied to a constant current source circuit and the rate of change in current flowing through a capacitor.

In the horizontal oscillator circuit 512, the time constant circuit 71 including the capacitor 13 and the resistor 14 is connected to the base terminal of the transistor 9 as shown in FIG. 4. Thus, the horizontal oscillator circuit 512, like the horizontal oscillator circuit 51, can change a current I312 flowing through the transistor 9 with the CR time constant, thereby switching the oscillating capacitor 8 more slowly than the background art horizontal oscillator circuit 151. The horizontal oscillator circuit 512 applied in place of the horizontal oscillator circuit 51 to the horizontal deflection circuit 61 of FIG. 3 can provide stable image display rapidly without the stresses applied to the horizontal output circuit 3 and the like in a manner similar to the horizontal oscillator circuit 51. However, the horizontal oscillator circuit 51 is superior in terms of operation stability to the horizontal oscillator circuit 512 when a variation occurs in a current amplification factor $h_{FE}$ of the transistor 9, e.g., when a variation resulting from variations in device characteristics and a temperature change during operation occurs. A difference in operation stability between the horizontal oscillator circuits 51 and 512 when a variation occurs in the current amplification factor $h_{FE}$ of the transistor 9 is described below with reference to FIG. 5. FIG. 5 is a graph schematically showing changes in the current I flowing through the capacitor 8b with time when the voltage VT121 is applied to the second end of the resistor 14 for the horizontal oscillator circuit 512. The pulse waveform C1 of FIG. 5 represents the voltage VT121, and the curves C2 represent the current I flowing through the capacitor 8b (or the collector or emitter current I312 of the transistor 9).

It is found from the graph of FIG. 5 that the current I or the current I312 gradually increases when the pulse voltage VT121 is applied to the second end of the resistor 14 at time t0 and that the rate of change in the current I or the current I312 depends on the current amplification factor $h_{FE}$.

In view of the fact that the frequency of the output pulse VT14 from the horizontal oscillation IC 1 is controlled by the current I flowing through the capacitor 8b, the curves C2 of FIG. 5 may be regarded as showing the course of change in the frequency of the output pulse VT14 after the application of the voltage VT121. When a variation in the current amplification factor $h_{FE}$ of the transistor 9 occurs, the rate of change in the frequency of the output pulse VT14 is varied, and it is hence difficult to make a stable change in the frequency of the pulse VT14. This might results in the electrical stresses applied to the horizontal output circuit 3 and the like.

With the horizontal oscillator circuit 51 of FIG. 3, on the other hand, the current I flowing through the capacitor 8b is given as the current value I31 from Equation (1), and hence does not depend on the value of the current amplification factor $h_{FE}$ of the transistor 9. The horizontal oscillator circuit 51 can make a stable change in the frequency of the output pulse VT14 without being affected by the variation in the current amplification factor $h_{FE}$. Thus, the horizontal oscillator circuit 51 is more preferred than the horizontal oscillator circuit 512 in terms of the stability of the rate of change in the frequency of the output pulse VT14 relative to the variation in the current amplification factor $h_{FE}$.

Figure 6:
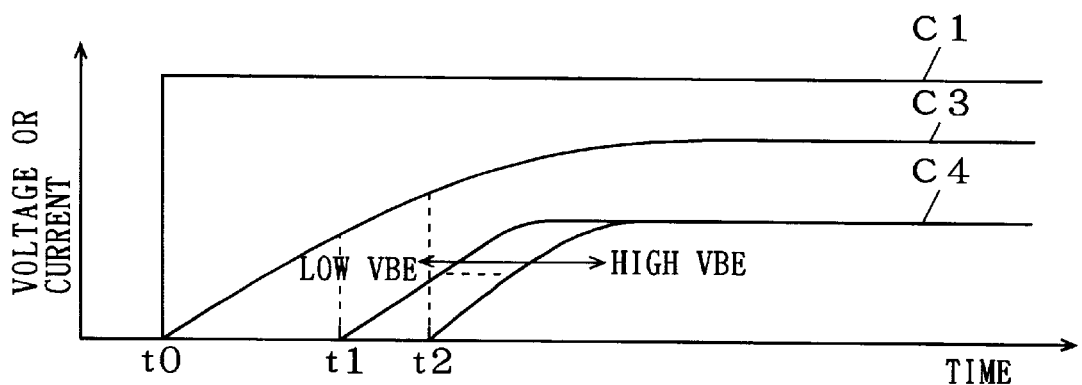
FIG. 6 is a graph showing a relationship between the control signal (voltage) applied to the constant current source circuit and the time at which current starts flowing through the capacitor.

Description will now be given on a difference in operation stability between the horizontal oscillator circuits 51 and 512 when a variation occurs in the forward voltage drop VBE between the base and the emitter of the transistor 9, e.g. when a variation resulting from variations in device characteristics and a temperature change during operation occurs, with reference to FIG. 6. FIG. 6 is a graph schematically showing changes in the base voltage VBE of the transistor 9 and the current I flowing through the capacitor 8b with time when the voltage VT121 is applied to the second end of the resistor 14 for the horizontal oscillator circuits 51 and 512. The pulse waveform C1 of FIG. 6 represents the voltage VT121, the curve C3 represents the base voltage VBE, and the curves C4 represent the current I flowing through the capacitor 8b.

It is found from the graph of FIG. 6 that the base voltage VB and the current I flowing through the capacitor 8b gradually increase after the application of the voltage VT121 in the horizontal oscillator circuits 51 and 512 and that the time (timing) at which the current I starts flowing depends on the forward voltage drop VBE and becomes later as the voltage VBE increases (See the times t1 and t2 of FIG. 6).

Since the curves C4 of FIG. 6, similar to the curves C2 of FIG. 5, may be regarded as showing the course of change in the frequency of the output pulse VT14 from the horizontal oscillation IC 1, the time at which the frequency of the pulse VT14 starts changing depends on the voltage VBE. Thus, a variation in the forward voltage drop VBE between the base and the emitter of the transistor 9 causes variations in the time when the frequency of the output pulse VT14 starts changing. This might result in the unstable operation.

An operation stability comparison is made between the horizontal oscillator circuits 51 and 512 when the base voltage VB is 4 V and the forward voltage drop VBE varies in a range from 0.4 V to 0.5 V, i.e. in a 0.45 V±0.05 V range.

In such a case, the horizontal oscillator circuit 512 has a variation in the voltage VBE which is 0.05 (V)/0.45 (V)= 11.1(%), i.e. 0.45 (V)±11.1(%).

With the horizontal oscillator circuit 51, on the other hand, the current I flowing through the capacitor 8b corresponds to the current value I31 given by Equation (1). For the voltage VBE having the variation within the above-mentioned range, the voltage level (VB−VBE) in Equation (1) falls within a 3.55 (V)±0.05 (V) range. Accordingly, the voltage level (VB−VBE) can make a variation of 0.05 (V)/3.55 (V)=1.4(%), i.e. a variation of 3.55(V)±1.4(%).

Since the range of the variation in the time at which the current I starts flowing through the capacitor 8b reflects the rate of variation in the above-mentioned voltages, the horizontal oscillator circuit 51 can suppress the time variation more successfully than the horizontal oscillator circuit 512. Thus, the horizontal oscillator circuit 51 is superior to the horizontal oscillator circuit 512 in terms of the stability of the time at which the frequency of the output pulse VT14 from the horizontal oscillator circuit relative to the variation in the voltage VBE.

As described hereinabove, the horizontal oscillator circuit 51 comprising the resistor 11 through which the emitter terminal of the transistor 9 is grounded can achieve the more stable operation than the horizontal oscillator circuit 512 which does not comprise the resistor 11.

Although the horizontal oscillator circuits 50 and 51 are illustrated herein as each comprising the two capacitors 8a and 8b serving as the oscillating capacitor 8 for purposes of convenience of illustration, the horizontal oscillator circuits 50 and 51 may comprises a plurality of capacitors connected to the terminal T12 of the horizontal oscillation IC 1, the plurality of capacitors having a configuration similar to that of the capacitor 8b and provided with a circuit corresponding to the switching circuit 40. In such a case, each of the plurality of capacitors corresponding to the capacitor 8b serves as a "second capacitor."

While the invention has been described in detail, the foregoing description is in all aspects illustrative and not restrictive. It is understood that numerous other modifications and variations can be devised without departing from the scope of the invention.

I claim:

1. A horizontal oscillator circuit comprising:

an oscillation circuit for generating an output signal synchronized with an input horizontal synchronizing signal to output said output signal, said oscillation circuit including an oscillation portion;

a first capacitor having a first end connected to said oscillation portion and a second end grounded for controlling a frequency of said output signal from said oscillation circuit;

a second capacitor having a first end connected to said first end of said first capacitor and a second end for controlling said frequency of said output signal in conjunction with said first capacitor; and a constant current source circuit having a control terminal and connected to said second end of said second capacitor for outputting an output current having a current value controllable by a control voltage applied to the control terminal thereof.

2. The horizontal oscillator circuit according to claim 1, wherein said constant current source circuit comprises:

a bipolar transistor having a collector terminal connected to said second end of said second capacitor, an emitter terminal, and a base terminal serving as said control terminal; and a resistor having a first end connected to said emitter terminal of said bipolar transistor, and a second end grounded.

3. The horizontal oscillator circuit according to claim 2, wherein said control voltage having a gradually changing voltage level is applied to said base terminal of said bipolar transistor when said constant current source circuit is activated and inactivated.

4. The horizontal oscillator circuit according to claim 2, further comprising a time constant circuit having an output terminal connected to said base terminal of said bipolar transistor.

\* \* \* \* \*